United States Patent
Sowizral et al.

(10) Patent No.: US 7,050,053 B2
(45) Date of Patent: May 23, 2006

(54) GEOMETRIC FOLDING FOR CONE-TREE DATA COMPRESSION

(75) Inventors: Henry A. Sowizral, Bellevue, WA (US); Karel Zikan, Seattle, WA (US); Randall G. Keller, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 819 days.

(21) Appl. No.: 10/060,979

(22) Filed: Jan. 30, 2002

(65) Prior Publication Data

US 2003/0160776 A1 Aug. 28, 2003

(51) Int. Cl.
*G06T 15/40* (2006.01)

(52) U.S. Cl. .................................... 345/421; 345/622

(58) Field of Classification Search ................ 345/419, 345/420, 421, 428, 620, 622
See application file for complete search history.

(56) References Cited

U.S. PATENT DOCUMENTS

| | | | |
|---|---|---|---|
| 6,300,965 B1 | 10/2001 | Sowizral et al. | |
| 6,373,485 B1 * | 4/2002 | Sowizral et al. | 345/421 |
| 6,437,796 B1 * | 8/2002 | Sowizral et al. | 345/622 |
| 6,445,391 B1 | 9/2002 | Sowizral et al. | |

\* cited by examiner

*Primary Examiner*—Mark Zimmerman
*Assistant Examiner*—Enrique L Santiago
(74) *Attorney, Agent, or Firm*—Meyertons Hood Kivlin Kowert & Goetzel, P.,C.; Jeffrey C. Hood; Mark K. Brightwell

(57) ABSTRACT

A system for performing visible object determination. Visualization software executing on one or more processors searches a cone tree with respect to a hull tree. Both trees respect the same group of transformations. Thus, the cone tree as stored in memory need not store all branches down to ultimate resolution. For example, the cone tree may store a selected cone and all its subcones down to the ultimate resolution, while subcones of other cones at the same level as the selected cone may not be represented in the stored cone tree. When the visualization software encounters a nonstored cone and a given hull H in its search procedure, the visualization software may apply an appropriate one of the group transformations to the given hull, and search the tranformed hull with respect to the selected cone (or a subcone of the selected cone).

32 Claims, 6 Drawing Sheets

Search a hull tree and a cone tree stored in memory to identify one or more visible hulls, where the cone tree includes a base cone refined down to an ultimate refinement level
310

Transfer indications of the visible hulls to a rendering agent which is configured to render pixels in response to receiving the visible hull indications
320

GEOMETRIC FOLDING FOR CONE-TREE DATA COMPRESSION

BACKGROUND OF THE INVENTION

1. Field of the Invention

The present invention relates generally to the field of computer graphics, and more particularly, to the problem of determining the set of objects (and portions of objects) visible from a defined viewpoint in a graphics environment.

2. Description of the Related Art

Visualization software has proven to be very useful in evaluating three-dimensional designs long before the physical realization of those designs. In addition, visualization software has shown its cost effectiveness by allowing engineering companies to find design problems early in the design cycle, thus saving them significant amounts of money. Unfortunately, the need to view more and more complex scenes has outpaced the ability of graphics hardware systems to display them at reasonable frame rates. As scene complexity grows, visualization software designers need to carefully use the rendering resource provided by graphic hardware pipelines.

A hardware pipeline wastes rendering bandwidth when it discards rendered triangle work. Rendering bandwidth waste can be decreased by not asking the pipeline to draw triangles that it will discard. Various software methods for reducing pipeline waste have evolved over time. Each technique reduces waste at a different point within the pipeline. As an example, software culling of objects falling outside the view frustum can significantly reduce discards in a pipeline's clipping computation. Similarly, software culling of back-facing triangles can reduce discards in a pipeline's lighting computation.

The z-buffer is the final part of the graphics pipeline that discards work. In essence, the z-buffer retains visible surfaces, and discards those not visible because they are behind another surface (i.e. occluded). As scene complexity increases, especially in walk-through and CAD environments, the number of occluded surfaces rises rapidly and as a result the number of surfaces that the z-buffer discards rises as well. A frame's average depth complexity determines roughly how much work (and thus rendering bandwidth) the z-buffer discards. In a frame with a per-pixel depth complexity of d the pipeline's effectiveness is 1/d. As depth complexity rises, the hardware pipeline thus becomes proportionally less and less effective.

Software occlusion culling has been proposed as an additional tool for improving rendering effectiveness. A visualization program which performs occlusion culling effectively increases the overall rendering bandwidth of the graphics hardware by not asking the hardware pipeline to draw occluded objects. Computing a scene's visible objects is the complementary problem to that of occlusion culling. Rather than removing occluded objects from the set of objects in a scene or frustum-culled scene, a program instead computes which objects are visible and instructs the rendering hardware to draw just those. A simple visualization program can compute the set of visible objects and draw those objects from the current viewpoint, thus allowing the pipeline to focus on removing backfacing polygons and the z-buffer to remove any non-visible surfaces of those objects.

One technique for computing the visible object set uses ray casting. RealEyes [Sowizral, H. A., Zikan, K., Esposito, C., Janin, A., Mizell, D., "RealEyes: A System for Visualizing Very Large Physical Structures", SIGGRAPH '94, Visual Proceedings, 1994, p. 228], a system that implemented the ray casting technique, was demonstrated in SIGGRAPH 1994's BOOM room. At interactive rates, visitors could "walk" around the interior of a Boeing 747 or explore the structures comprising Space Station Freedom's lab module.

The intuition for the use of rays in determining visibility relies on the properties of light. The first object encountered along a ray is visible since it alone can reflect light into the viewer's eye. Also, that object interposes itself between the viewer and all succeeding objects along the ray making them not visible. In the discrete world of computer graphics, it is difficult to propagate a continuum of rays. So a discrete subset of rays is invariably used. Of course, this implies that visible objects or segments of objects smaller than the resolution of the ray sample may be missed and not discovered. This is because rays guarantee correct determination of visible objects only up to the density of the ray-sample.

Visible-object determination has its roots in visible-surface determination. Foley et al. [Foley, J., van Dam, A., Feiner, S. and Hughes, J. Computer Graphics: Principles and Practice, 2nd ed., Addison-Wesley, Chapter 15, pp.649–718, 1996] classify visible-surface determination approaches into two broad groups: image-precision and object-precision algorithms. Image precision algorithms typically operate at the resolution of the display device and tend to have superior performance computationally. Object precision approaches operate in object space—usually performing object to object comparisons.

A prototypical image-precision visible-surface-determination algorithm casts rays from the viewpoint through the center of each display pixel to determine the nearest visible surface along each ray. The list of applications of visible-surface ray casting (or ray tracing) is long and distinguished. Appel ["Some Techniques for Shading Machine Rendering of Solids", SJCC'68, pp. 37–45, 1968] uses ray casting for shading. Goldstein and Nagel [Mathematical Applications Group, Inc., "3-D Simulated Graphics Offered by Service Bureau," Datamation, 13(1), February 1968, p. 69.; see also Goldstein, R. A. and Nagel, R., "3-D Visual Simulation", Simulation, 16(1), pp.25–31, 1971] use ray casting for boolean set operations. Kay et al. [Kay, D. S. and Greenberg, D., "Transparency for Computer Synthesized Images," SIGGRAPH'79, pp.158–164] and Whitted ["An Improved Illumination Model for Shaded Display", CACM, 23(6), pp.343–349, 1980] use ray tracing for refraction and specular reflection computations. Airey et al. [Airey, J. M., Rohlf, J. H. and Brooks, Jr. F. P., "Towards Image Realism with Interactive Update Rates in Complex Virtual Building Environments", ACM SIGGRAPH Symposium on Interactive 3D Graphics, 24, 2(1990), pp. 41–50] uses ray casting for computing the portion of a model visible from a given cell.

Another approach to visible-surface determination relies on sending beams or cones into a database of surfaces [see Dadoun et al., "Hierarchical approachs to hidden surface intersection testing", Proceeedings of Graphics Interface '82, Toronto, May 1982, 49–56; see also Dadoun et al., "The geometry of beam tracing", In Joseph O'Rourke, ed., Proceeedings of the Symposium on Computational Geometry, pp.55–61, ACM Press, New York, 1985]. Essentially, beams become a replacement for rays. The approach usually results in compact beams decomposing into a set of possibly non-connected cone(s) after interacting with an object.

A variety of spatial subdivision schemes have been used to impose a spatial structure on the objects in a scene. The following four references pertain to spatial subdivision schemes: (a) Glassner, "Space subdivision for fast ray tracing," IEEE CG&A, 4(10):15–22, October 1984; (b) Jevans et al., "Adaptive voxel subdivision for ray tracing," Proceedings Graphics Interface '89, 164–172, June 1989; (c) Kaplan, M. "The use of spatial coherence in ray tracing," in Techniques for Computer Graphics . . . , Rogers, D. and Earnshaw, R. A. (eds), Springer-Verlag, New York, 1987; and (d) Rubin, S. M. and Whitted, T. "A 3-dimensional representation for fast rendering of complex scenes," Computer Graphics, 14(3):110–116, July 1980.

Kay et al. [Kay, T. L. and Kajiya, J. T., "Ray Tracing Complex Scenes", SIGGRAPH 1986, pp. 269–278,1986], concentrating on the computational aspect of ray casting, employed a hierarchy of spatial bounding volumes in conjunction with rays, to determine the visible objects along each ray. Of course, the spatial hierarchy needs to be precomputed. However, once in place, such a hierarchy facilitates a recursive computation for finding objects. If the environment is stationary, the same data-structure facilitates finding the visible object along any ray from any origin.

Teller et al. [Teller, S. and Sequin, C. H., "Visibility Preprocessing for Interactive Walkthroughs," SIGGRAPH '91, pp.61–69] use preprocessing to full advantage in visible-object computation by precomputing cell-to-cell visibility. Their approach is essentially an object precision approach and they report over 6 hours of preprocessing time to calculate 58 Mbytes of visibility information for a 250,000 polygon model on a 50 MIP machine [Teller, S. and Sequin. C. H., "Visibility computations in polyhedral three-dimensional environments," U. C. Berkeley Report No. UCB/CSD 92/680, April 1992].

In a different approach to visibility computation, Greene et al. [Greene, N., Kass, M., and Miller, G., "Hierarchical z-Buffer Visibility," SIGGRAPH '93, pp.231–238] use a variety of hierarchical data structures to help exploit the spatial structure inherent in object space (an octree of objects), the image structure inherent in pixels (a Z pyramid), and the temporal structure inherent in frame-by-frame rendering (a list of previously visible octree nodes). The Z-pyramid permits the rapid culling of large portions of the model by testing for visibility using a rapid scan conversion of the cubes in the octree.

As used herein, the term "octree" refers to a data structure derived from a hierarchical subdivision of a three-dimensional space based on octants. The three-dimensional space may be divided into octants based on three mutually perpendicular partitioning planes. Each octant may be further partitioned into eight sub-octants based on three more partitioning planes. Each sub-octant may be partitioned into eight sub-suboctants, and so forth. Each octant, sub-octant, etc., may be assigned a node in the data structure. For more information concerning octrees, see pages 550–555, 559–560 and 695–698 of *Computer Graphics: principles and practice*, James D. Foley et al., $2^{nd}$ edition in C, ISBN 0-201-84840-6, T385.C5735, 1996.

The depth complexity of graphical environments continues to increase in response to consumer demand for realism and performance. Thus, the efficiency of an algorithm for visible object determination has a direct impact on the marketability of a visualization system. The computational bandwidth required by the visible object determination algorithm determines the class of processor required for the visualization system, and thereby affects overall system cost. Thus, improved systems and methods for performing visible object determination are greatly desired.

Furthermore, the large size of data structures associated with the visualization software may have a negative impact on performance and system cost. A large data structure consumes memory space (especially RAM space) which could be used by other processes, takes a long time to transfer across physical interfaces, and implies a longer time to completion for the visibility algorithm. Thus, there exists a significant need for a system and method of performing visible object determination which uses memory more efficiently, i.e. which uses more compact data structures.

SUMMARY OF THE PRESENT INVENTION

Various embodiments of a system and method for performing visible object determination based upon a dual search of a cone hierarchy and a bounding hierarchy are herein disclosed. In one embodiment, the system may comprise one or more processors, one or more display devices, system memory, and optionally a graphics accelerator. The processor executes visualization software which operates on a collection of graphics objects to determine a visible subset of the objects from a defined viewpoint. The objects may reside in a three-dimensional space and thus admit the possibility of occluding one another.

The visualization software operates on a tree of cones emanating from a viewpoint. In one embodiment, the leaf-cones of the cone hierarchy, i.e. the cones at the ultimate level of refinement, subtend an area which corresponds to a fraction of a pixel in screen area. For example, two cones may conveniently fill the area of a pixel. In other embodiments, a leaf-cone may subtend areas which include one or more pixels. The entire space around the viewpoint may be recursively tessellated to generate the cone hierarchy.

The visualization software may also use a tree of hulls that bound the collection of objects. In particular, the hull tree may be generated by: (a) recursively grouping clusters starting with the objects themselves as order-zero clusters, (b) bounding each object and cluster (of all orders) with a corresponding bound, e.g. a polytope hull, (c) allocating a node in the hull tree for each object and cluster, and (d) organizing the nodes in the hull tree to reflect cluster membership. For example if node A is the parent of node B, the cluster corresponding to node A contains a subcluster (or object) corresponding to node B. Each node stores parameters which characterize the hull of the corresponding cluster or object.

The visualization software may perform a search of the cone tree structure and the hull tree structure starting with the root cone and the root hull. In one embodiment, each leaf-cone may be assigned a visibility distance value which represents the distance to the closest known object as perceived from within the leaf-cone. Each leaf-cone may also be assigned an object attribute which specifies the closest known object (or leaf hull) within view of the leaf-cone. Similarly, each non-leaf cone may be assigned a visibility distance value. However, the visibility distance value of a non-leaf cone may be set equal to the maximum of the visibility distance values for its subcone children. This implies that the visibility distance value for each non-leaf cone equals the maximum of the visibility distance values of its leaf-cone descendents.

In response to execution of the visualization software, the processor may perform a visibility search method which comprises: (a) receiving a cone pointer which points to the cone tree structure stored in a memory, (b) receiving a hull pointer which points to the hull tree structure stored in the memory, wherein leaf hulls of the hull tree structure approximate a collection of graphical objects, (c) searching the cone tree structure and the hull tree structure to determine one or more nearest graphical objects for one or more cones of the cone tree structure, and (d) transmitting an indication of the one or more nearest graphical objects for the one or more cones to a rendering agent such as a software renderer or a hardware rendering unit. The rendering agent generates pixel values (and/or samples) for the indicated objects.

The dual-tree search may be illustrated in terms of a first cone of the cone tree structure and a first hull of the hull tree structure. The processor may compute a hull size for the first hull, and may compare the hull size to a cone size corresponding to the first cone. If the hull size is larger than the cone size, the processor may search subhulls of the first hull with respect to the first cone. Conversely, if the cone size is larger than the hull size, the processor may search subcones of the first cone with respect to the first hull. A variety of methods are contemplated for computing the cone size and the hull size. By selecting the larger entity (first hull or first cone) for refinement, the visibility search method may, in some embodiments, prune the combined cone-hull tree more effectively, and determine the set of visible objects with increased efficiency.

In one set of embodiments, the cone tree and the hull tree respect the same group of transformations (e.g. the group of 3×3 signed permutation matrices). Thus, the cone tree as stored in memory need not store all branches down to ultimate resolution. As illustrated in FIG. 1, the cone tree may store a selected cone and all its subcones down to the ultimate resolution, while subcones of other cones at the same level as the selected cone may not be represented in the stored cone tree. When the visualization software encounters a peer cone (i.e. one of the other cones at the same level as the base cone) and a given hull H in its search procedure, the visualization software may apply an appropriate one of the group transformations to the given hull, and conditionally search the tranformed hull with respect to the selected cone. The conditional search includes computing a cone-hull distance D1 between the selected cone and the transformed hull. If the cone-hull distance D1 is less than the visibility distance value of the selected cone, the visualization software may search the selected cone with respect to the transformed hull.

Because the visualization sofware is configured to exploit the group invariance of the cone-hull distance computation, the stored cone tree may be significantly smaller than a cone tree fully resolved (i.e. all branches resolved) down to the same ultimate level. This implies that the stored cone tree may include more refinement levels than if the fully resolved tree were used, or may fit in a smaller memory if the number of refinement levels is kept the same.

BRIEF DESCRIPTION OF THE FIGURES

The foregoing, as well as other objects, features, and advantages of this invention may be more completely understood by reference to the following detailed description when read together with the accompanying drawings in which.

Figure 1:
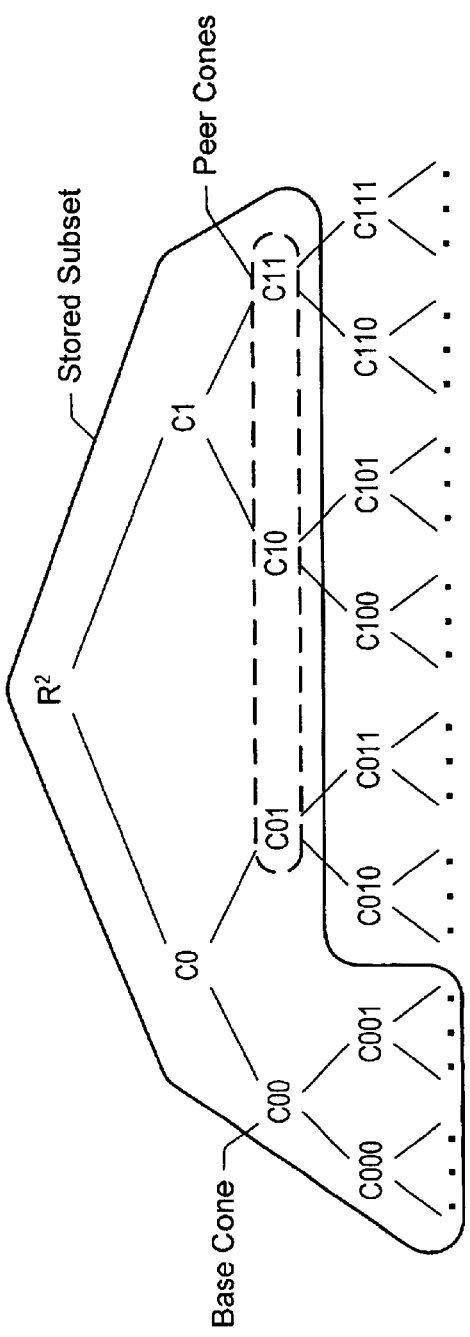
FIG. 1 illustrates one embodiment of a cone tree which hierarchically partitions a two dimensional space.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF SEVERAL EMBODIMENTS

In one set of embodiments, a graphical computing system may be configured to operate on a collection of graphical objects so as to determine which of the objects are visible from a current viewpoint. The system searches a hierarchical tree of bounding hulls (or more general bounding structures) and a hierarchical tree of cones.

The tree of bounding hulls may be constructed from the bottom up, i.e. by generating first-order bounding hulls enclosing the graphical objects, second order bounding hulls enclosing groups of the first order bounding hulls, and so on, until at some level there is a single bounding hull enclosing the whole collection of objects.

The tree of cones may be constructed from the top down. A three dimensional space may be interpreted as a cone (i.e. as the union of all rays emanating from the origin). The 3D space may be partioned into some number of first order subcones. The first order subcones may be partitioned into second order subcones, and so on, until at some ultimate refinement level, the subcones are fine enough for the purpose at hand. For example, in some graphical applications, ultimate subcones (referred to herein as leaf cones) subtend a screen area equal to a pixel area or some fraction of a pixel area.

Observe that the size of the cone tree grows exponentially as the number of refinement levels increases. For a binary tree with N levels, the number of cones in the cone tree equals $1+2+4+ \ldots +2^N = 2^{N+1}-1$.

Figure 2:
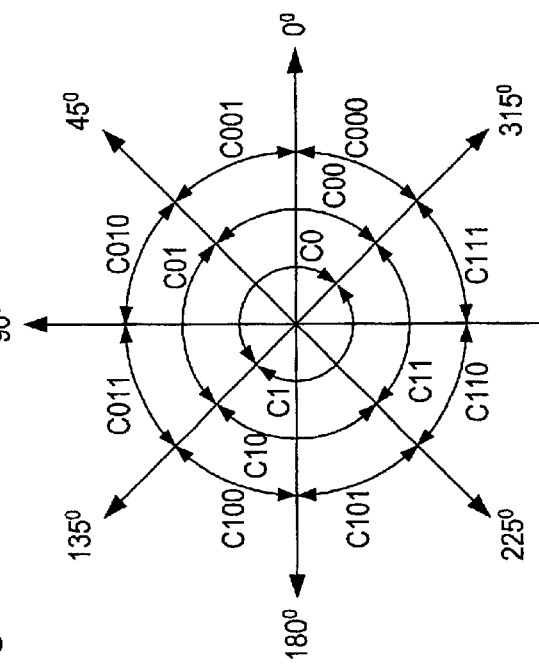
FIG. 2 illustrates an arrangement of the cones of the cone tree of FIG. 1 in the dimensional space.

FIG. 1 illustrates a hierarchical tree which has a binary structure. The intial cone covers the whole plane ($R^2$). FIG. 2 shows the arrangement of the cones in the plane. C0 and C1 are half-planes. C00, C01, C10 and C11 are quarter-planes. C000, C001, C010, C011, C100, C101, C110 and C111 each cover an eighth of the plane. Cones at each level subtend half the angular measure of cones at the previous level.

A cone C in a cone tree may be expressed as the solution set of the vector inequality $$Sx \leq 0,$$

where the rows of matrix S are normal vectors defining the planar boundaries of the cone C, where x is a vector variable. The vector inequality $a \leq b$ between two vectors a and b is true if and only if $a_i \leq b_i$ for all i. When S is empty, the cone C equals the entire space. When S has only one row, the cone C is a half-space. Other characterizations of a cone are possible and are not to be categorically excluded.

Similarly, a bounding hull H may be expressed as the solution set of the vector inequality $$Ax \leq b,$$

where the rows of matrix A are the normal vectors for the planar boundaries of the hull H, where b is a vector of displacement values specifying where along each of the normal lines (generated by the normal vectors) the corresponding boundary plane is to be positioned. For convenience, the hull H may be summarized by the notation (A,b).

While it is possible for each hull in the hull tree to have its own matrix A, it is much more efficient (from the point of view of memory consumption) for all the hulls of the hull tree to use the same matrix A. A collection of hulls (or a tree of hulls) that share the same matrix A is said to be commonly generated.

A hull tree comprises hull nodes. Each hull node stores parameters for the corresponding hull. For a commonly generated hull tree, each hull node has space allocated for the displacment vector b of the corresponding hull. A hull node may also have space allocated for a pointer to a parent hull node and/or pointers to children hull nodes. The matrix A may be stored separately from the hull nodes (because it is shared in common by all the hull nodes).

A number of advantages arise from carefully choosing the cones of the cone tree and the hulls of the hull tree so that they respect a group of transformations on the underlying space. For example, consider the cones C00, C01, C10 and C11 in the cone tree of FIG. 2. (A cone in 2D is the area between two rays emanating from a common point. The four rays emanating from the origin at 45, 135, 225 and 315 degrees define the boundaries of the four cones.) Thus, rotations of the plane by any integer multiple of 90 degrees are special in following sense. Any of these rotations will carry any of the cones C00–C11 onto another of the cones C00–C11. Furthermore, the cones C000, C001, C010, C011, C100, C101, C110 and C111 at the next level down in the cone tree also respect this group of rotations, i.e. any of the rotations will carry any of the eight cones onto another one of the eight cones in a one-to-one fashion.

Given a space of a particular dimension, there may be a number of different cone trees with each cone tree respecting a correspondingly different transformation group. For example, one may partition the plane into three cones by three rays emanating from the origin at 0, 120 and 240 degrees. Then each of the three cones may be partitioned into three subcones by trisecting rays, and so on, down to some ultimate refinement level. This cone tree would then respect plane rotations by any integer multiple of 120 degrees.

A cone tree is said to respect a group of transformations if there exists a level K such that cones at level K and below (down to the leaf cones) respect the group of transformations.

Let N denote the set of normal vectors making up the rows of normal matrix A. The set N of normal vectors is said to respect a group of transformations if each transformation in the transformation group maps the set N onto itself in a one-to-one fashion. Thus, each transformation U in the transformation group merely permutes the order of the normal vectors in the set N. In other words, for each transformation U, there exists a unique permutation matrix $P_U$ so that $AU^T = P_U A$, where the superscript T denotes the transpose operation.

A collection/tree of hulls generated by the matrix A is said to respect a group of transformations when the set N of normals composed from the rows of matrix A respects the group of transformations. Henceforth, unless stated otherwise, assume that the set N and the cone tree respect the same group of transformations.

If vector x satisfies a hull inequality $Ax \leq b$, and vector $y = Ux$, then $AU^{-1}y \leq b$ by substitution of $x = U^{-1}y$. In one set of embodiments, the transformations of the transformation group are orthogonal transformations, i.e. $U^{-1} = U^T$. It follows that $AU^T y \leq b$. However, as noted above $AU^T = P_U A$. This implies that $P_U A y \leq b$.

Let $Q_U$ represent the permutation matrix which corresponds to transformation $U^{-1}$. Note that $Q_U P_U$ is the identity matrix. Left multiplying by $Q_U$ on both sides gives the inequality $Ay \leq Q_U b$. Thus, the image of the hull (A,b) under the transformation U is the hull $(A, Q_U b)$. In other words, the image of a hull generated by matrix A under a group transformation is also a hull generated by matrix A. Note that the displacment vector for the image hull is obtained by permuting the elements of the displacement vector b with the permutation $Q_U$ corresponding to the inverse of transformation U.

Figure 3:
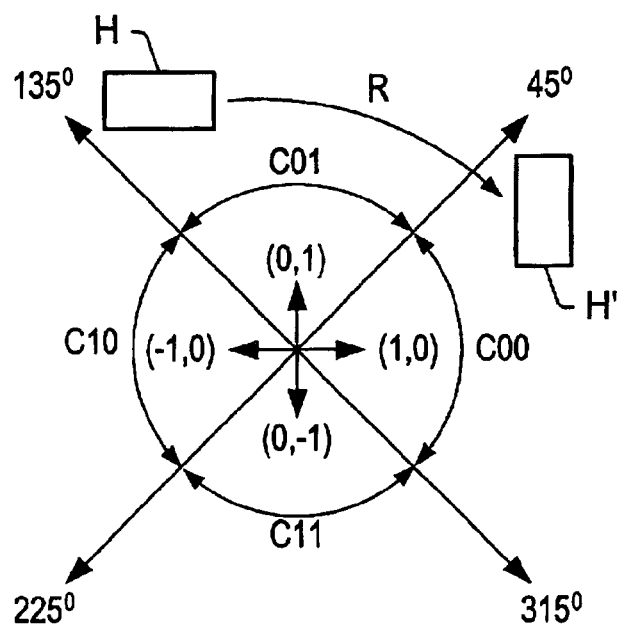
FIG. 3 illustrates the invariance of the rectangular family of hull normals under the group of rotations by mulitples of 90 degrees.

As an example, consider the normal set N given by the vectors (1,0), (0,1), (−1,0), (0,−1) as suggested by FIG. 3. The bounding hulls generated by this normal set are the set of rectangles in the plane. Any plane rotation by an integer multiple of 90 degrees will map the set N onto itself in a one-to-one fashion. For example, the clockwise rotation R of the hull H1 given by displacement vector $(-1,6,4,5)^T$ is the hull H1' given by the displacement vector $(6,4,5,-1)^T$, where the superscript T denotes the matrix transpose operator. Note that the numbers −1, 6, 4 and 5 have been permuted.

In one set of embodimetns, the search of the cone tree and the hull tree is based on a cone-hull distance evaluation (or more generally, a cone-hull extent evaluation). For example, the distance d(C,H) between a cone C and a hull H may be defined as $$\min_{\langle v, x \rangle} : Ax \leq b, \; Sx \leq 0,$$

where v is a vector interior to (or polar to) the cone C, where $\langle v, x \rangle$ is the dot product (or, more generally, an inner product) of the vector v and the vector x. The constraint $Ax \leq b$ implies that the point x resides within the hull H. The constraint $Sx \leq 0$ implies that the point x resides within the cone C. In one embodiment, vector v may be set equal to $v = -S^T e$ where vector e is the vector of all ones. (It is noted that the matrix S of cone normals are outward normals to the cone surfaces. Thus, the negation of the sum of the normal vectors gives a polar vector.)

If the cone C and the hull H have an empty intersection, the minimum may be set equal to positive infinity. Note that the computation of the distance d(C,H) given above is a linear programming problem.

The process of evaluating the cone-hull distance between the cone C and the hull H is referred to as a cone-hull query. If the query indicates an empty intersection between the cone C and hull H, it is immediately apparent that none of the descendents of cone C can intersect any of the descendents of hull H.

Observe that the cone-hull distance is invariant under any transformation U in the transformation group, i.e.

$$\min<v,x>: x \in H \cap C$$

is equal to $$\min<Uv,y>: y \in UH \cap UC,$$

where UH is the image of hull H under the transformation U, and UC is the image of cone C under the transformation U, i.e.

$$UH=\{Ux:x \in H\} \text{ and}$$

$$UC=\{Ux:x \in C\}.$$

In other words, the distance d(C,H) between cone C and hull H is the same as the distance d(UC,UH) between the transformed cone UC and the transformed hull UH. The constraint $y \in UH \cap UC$ means that vector x satisfies the expression $$Ay \leq Q_U b \char`\^ SU^T y \leq 0.$$

S is the describing matrix for cone C, and $SU^T$ is the describing matrix for the image cone UC. If cone C is at level K or lower of the cone tree, the image cone UC is also a cone in the cone tree.

Let [C] denote the cone subtree including cone C and all its descendents in the cone tree. Let [H] denote the hull subtree including hull H and all its descendents in the hull tree.

Let U[H] denote the tree of hulls that results from applying the group transformation U to the subtree [H]. Note that [H] and U[H] have the same structure since A is a subset of B if and only if UA is a subset of UB. The displacement vectors of hulls in U[H] are permuted versions of the displacement vectors in subtree [H], i.e. permuted by the permutation $Q_U$ corresponding to transformation $U^{-1}$. In practice, each hull of tree U[H] is generated on the fly as needed by reading the displacement vector b of the corresponding hull from subtree [H] and applying the permutation $Q_U$ to the displacement vector b. It is not necessary to separately store tree U[H].

One consequence of the group invariance of the cone-hull distance is that a search of subtree [C] with respect to subtree [H] is equivalent to a search of subtree [UC] with respect to tree U[H]. A subcone X of cone C intersects a subhull Y of hull H if and only if subcone UX intersects UY. This equivalence implies that it is not necessary to store the complete cone tree in memory.

In one set of embodiments, only a selected subset of the cones from the cone tree are actually stored in memory. For example, one of the cones at level K of the cone tree may be designated as a "base cone", and the stored subset may be defined in terms of the base cone as follows. The stored subset may comprise (a) the base cone, (b) all cones beneath the base cone in the cone tree, (c) cones other than the base cone at level K of the cone tree, and (d) cones at levels above level K as suggested by FIG. 2. The cones at level K other than the base cone are referred to herein as peer cones. Cones beneath the peer cones are preferably not included in the stored subset. Their storage is not required because they are equivalent by transformation to cones beneath the base cone. (Cones beneath the base cone are part of the stored subset.) In FIG. 1, cone C00 is designated as the base cone. Thus, cones C01, C10 and C11 are peer cones.

Each stored cone (i.e. each cone in the stored subset) may be represented by a data structure called a cone node. The cone node may store the matrix S of normal vectors for the corresponding cone, a pointer to a parent cone (if one exists) and/or pointers to its children cones (if they exist).

The visiblity search procedure operates on cone nodes from the cone tree and hull nodes from the hull tree generally working its way down both trees as long as there continues to be nonempty intersection between cones and hulls. If a cone-hull distance computation d(C,H) between a cone C and a hull H indicates a non-empty intersection between the cone C and the hull H, the visibility search procedure may query the hull H with respect to subcones of the cone C, or, query the cone C with respect to subhulls of the hull H. However, as described above, subcones of the peer cones are not part of the stored subset (i.e. are not stored in memory). Thus, it may not be possible to directly search the subtree [C] generated by a peer cone C with respect to a subtree [H] generated by the hull H.

In one set of embodiments, the visibility search procedure is configured to perform an equivalent search, i.e. to search the subtree $[C_{base}]$ with respect to the tree U[H] whenever a peer cone C and a hull H are encountered, where U is the group transformation that carries the peer cone C onto the base cone $C_{base}$. (For each peer cone C, there exists a group transformation U that carries the peer cone C onto the base cone $C_{base}$.) This equivalent search is directly realizable because the subtree $[C_{base}]$ is stored in memory.

As noted above, it is not necessary to separately store the tree U[H] in memory. Rather, the visiblity search procedure may read the displacement vector b of a hull H in subtree [H] from memory as needed and apply the permutation $Q_U$ to the displacement vector b to generate the displacement vector $Q_U$ of the corresponding transformed hull UH. The permutation matrix $Q_U$ (or some representation thereof) may be stored as part of the cone node corresponding to peer cone C. In one embodiment, the permutation matrix $Q_U$ may occupy the data field in the cone node which is normally occupied by the describing matrix S.

In performing the equivalent search, the visibility search procedure may identify a leaf hull $H_{leaf}$ in the subtree [H] whose image $UH_{leaf}$ under the transformation U is visible with respect to a leaf cone $C_{leaf}$ in subtree $[C_{base}]$. This implies that the leaf hull $H_{leaf}$ is visible with respect to the inverse transformed cone $U^{-1}C_{leaf}$. In this case, the visibility search procedure may store a pointer to the leaf hull $H_{leaf}$ in the cone node corresponding to the leaf cone $C_{leaf}$.

It is noted that the visibility search procedure may encounter the base cone $C_{base}$ as well as a peer cone. In this case, the visibility search procedure performs a direct search of the subtree $[C_{base}]$ with respect to the subtree [H]. In a direct search, there is no need to permute the elements of the displacment vectors from the subtree [H].

In one embodiment, after an equivalent search or direct search is completed, a post-processing procedure may generate a list of visible leaf hulls (i.e. pointers to visible leaf hulls stored in the leaf cone nodes) identified in the equivalent search or the direct search. The post-processing procedure may operate on the list to eliminate list redundancies, as it is possible for a single leaf hull to intersect multiple leaf cones. The list of visible leaf hulls may be forwarded to a rendering agent.

The rendering agent may perform 3D rendering computations on the visible leaf hulls in order to generate video pixels. The video pixels may be converted into one or more analog video signals, and the analog video signals may be provided to one or more display devices such as monitors or projectors. The rendering agent may be implemented in software on one or more programmable processors, in dedicated hardware, or in some combination of programmble and dedicated hardware.

After forwarding the list of visible leaf hulls to the rendering agent, the subtree $[C_{base}]$ may be reinitialized and the visibility search procedure may be resumed, whereupon the visiblity search procedure may perform another equivalent search or a direct search of the base cone $C_{base}$ with respect to the same hull or a different hull. Reinitialization of subtree $[C_{base}]$ may involve setting visibility distance values of cone nodes to infinite visibility, and setting the hull pointers of leaf cone nodes to the infinite background object or to a null pointer.

In some embodiments, the post-processing procedure may transmit a tag to the rendering agent, the tag indicating the level K cone for which the direct or equivalent search was initiated, along with the list of visible leaf hulls. The rendering agent may filter the visible leaf hulls based on a current viewing direction. The current viewing direction may define a current view frustum. The visible leaf hulls from peer cones that do not intersect the current view frustum may be dropped (i.e. ignored).

In one embodiment, the visibility search procedure maintains information about the current view frustum, and skips level K cones that do not intersect the current view frustum. In this case, the rendering agent does not need to perform this view frustum culling based on peer cones.

Figure 4:
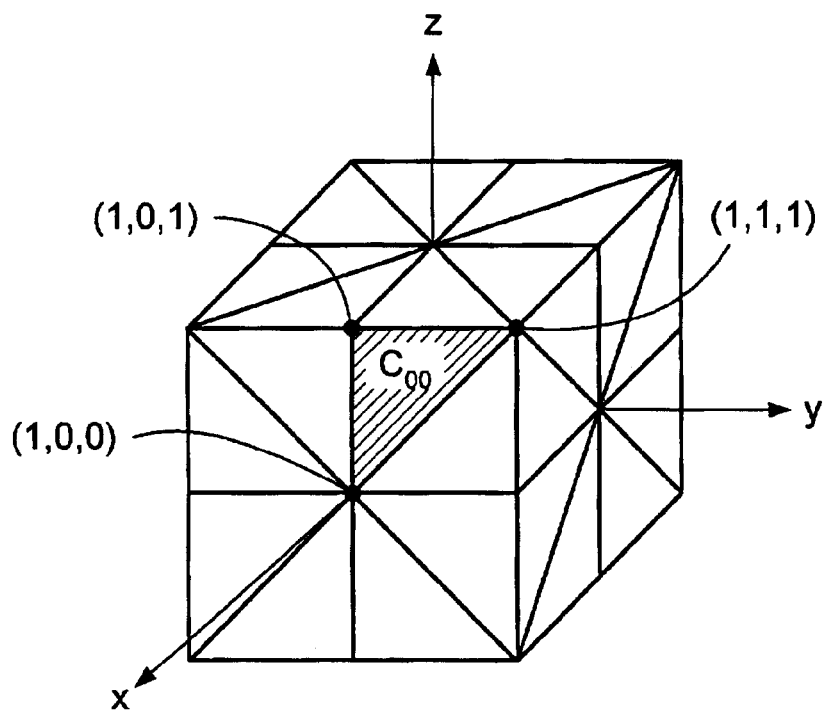
FIG. 4 illustrates one possible partitioning of three dimensional space into a system of 48 cones.

The examples described heretofore have involved a two dimensional ambient space. However, the visibility search procedure naturally generalizes to spaces of arbitrary dimension. FIG. 4 presents one possible partitioning of three-dimensional space into 48 cones. The 48 cones emanate from the origin and extend out to infinity. Each cone is illustrated by its intersection with the surface of a unit radius cube. The cube may be centered at the origin and each of the faces of the cube may be perpendicular to one of the three axes (i.e. x, y or z). Each face of the cube corresponds to eight of the 48 cones.

Figure 5:
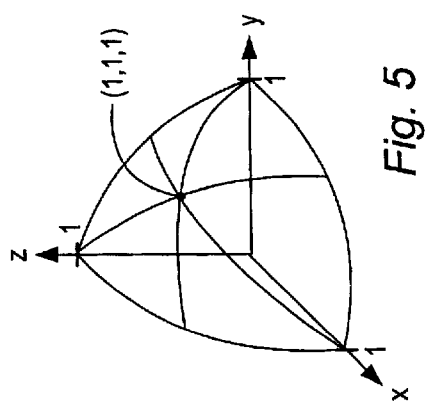
FIG. 5 illustrates an alternative interpretation of the 48 way cone partitioning of three dimensional space.

FIG. 5 illustrates an equivalent way of visualizing the 48 cones based on their intersections with a sphere of radius one. Each octant corresponds to six of the 48 cones. For simplicity, FIG. 5 illustrates only the six cones in the all-positive octant. The six cones are generated from the octant by the dividing planes x=y, y=z and x=z.

Figure 6:
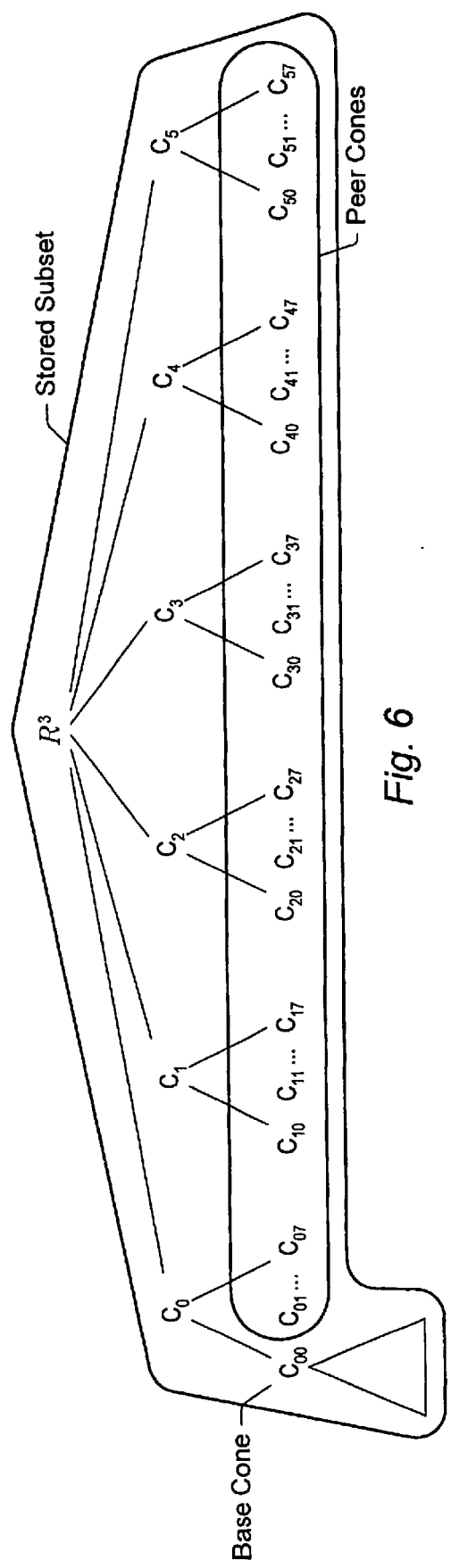
FIG. 6 illustrates one embodiment of a cone tree incorporating the 48 way cone partitioning of FIG. 4.

There are various ways of generating cone trees which incorporate the 48 cones. Any cone tree which includes the 48 cones as one of its levels is said to be a 48-way symmetric cone tree. FIG. 6 illustrates one 48-way symmetric cone tree where the top level cone (representing the entire space) is divided into six face cones corresponding to the faces of the cube, and each of the six face cones includes eight of the 48 cones. The six faces cones are labelled with a single index running from zero to five. The 48 cones are labelled with two indices, the first running from zero to five, and the second running from zero to seven.

In another embodiment, a 48-way symmetric cone tree may be generated as follows. The top level cone (representing the entire space) may be subdivided into eight octant cones, and each of the eight octant cones may be subdivided into six sector cones to generate the 48 cones.

Observe that the 48 cones respect the transformation group G given by the signed 3×3 permutation matrices. Thus, for each cone $C_{ij}$ of the 48 cones, there exists a signed permutation matrix that carries the cone $C_{ij}$ onto the base cone $C_{00}$ generated by positive linear combinations of the vectors (1,0,0), (1,0,1) and (1,1,1). (Any of the 48 cones may be chosen as the base cone. However, cone $C_{00}$ is a convenient choice.) As before, the term "peer cone" is used to describe the 47 cones different from the base cone at the same level as the base cone. The base cone $C_{00}$ may be refined down to some desired ultimate refinement level. The cones beneath base cone $C_{00}$ are diagrammatically represented by the triangular wedge underneath $C_{00}$. The stored subset (i.e. the collection of cones that are stored in memory) may include the base cone, the cones beneath the base cone down to the ultimate refinement level, the 47 peers cones, and the cones at levels above the base cone. Because the 47 peer cones are not refined, the stored cone tree occupies almost $1/48^{th}$ the space it would have occupied if all the 48 cones were equally refined.

As described above, the visibility search procedure may operate with any cone tree and any system of hulls that respect the same group of transformations on the ambient space. Let $N_{rect}$ denote the set of six normal vectors (±1,0,0), (0, ±1,0) and (0,0, ±1). Let $A_{rect}$ represent the 6×3 matrix whose rows are these six normal vectors. It can be shown that the set $N_{rect}$ of normal vectors is invariant under the action of the group of 3×3 signed permutation matrices. Thus, the system of rectangular hulls defined by the corresponding matrix $A_{rect}$ respects the same transformation group, and the visibility search procedure may run as described above with this sytem of hulls and the any of the 48-way symmetric cone trees. In particular, the methodology of performing an equilavent search by transformation to substitute for the direct search when a peer cone is encountered runs as described above.

Another family of hulls that respects the group of signed permutations on three-dimensional space is generated by the set $N_{oct}$ of eight normal vectors (±1, ±1, ±1). These normal vectors may be visualized as pointing towards the eight corners of a cube centered at the origin. For convenience, this family of 8-sided hulls is referred to herein as the octahedral family because the octahedron is one of its members (i.e. the member corresponding to the displacement vector b having all components equal to some positive constant). Thus, the visiblity search procedure may use any of the 48-way symmetric cone trees with this octahedral family of hulls.

Yet another family of hulls that respects the group of signed permutations on three-dimensional space is generated by the set $N_{14}$ including the 8 normals of the octohedral family and the six normals of the rectangular family described above.

Yet another family of hulls that respects the group of signed permuations on three-dimensional space is the generated by the set $N_{20}$ of twenty normal vectors:

$$\left(0, \pm\frac{\phi}{2}, \pm\frac{1+\phi}{2}\right), \left(\pm\frac{\phi}{2}, \pm\frac{1+\phi}{2}, 0\right),$$

$$\left(\pm\frac{1+\phi}{2}, \pm\frac{\phi}{2}, 0\right) \text{ and } \left(\pm\frac{1}{2}, \pm\frac{1}{2}, \pm\frac{1}{2}\right),$$

where $$\phi = \frac{\sqrt{5}-1}{2}.$$

These normal vectors correspond to the vertices of a dodecahedron.

For convenience, this family of hulls is referred to herein as the dodecahedral family of hulls as the dodecahedron is a member of this family (i.e. the member corresponding to the displacement vector with all components equal to some positive constant). Recall that the dodecahedron is a regular polyhedron with 12 pentagonal faces, 30 edges, and 20 vertices. Thus, the visibility search procedure may use any of the 48-way symmetric cone trees with the dodecaheral family of hulls.

Figure 7A:
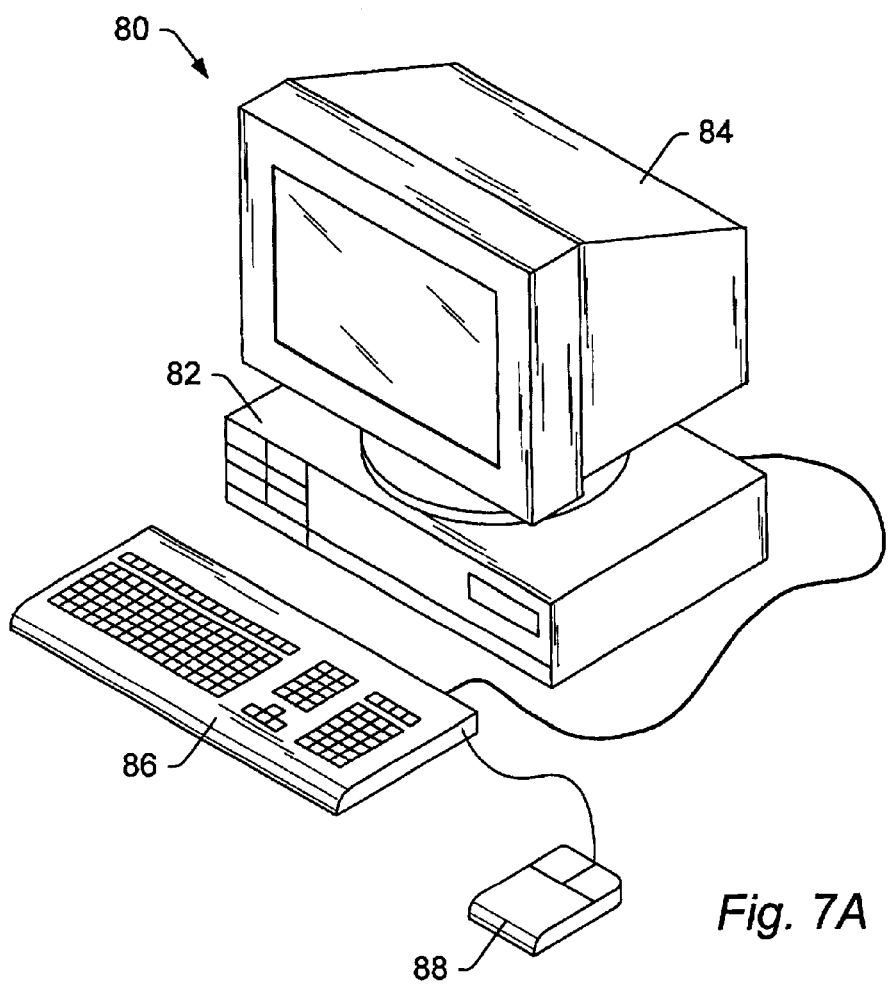
FIG. 7A illlustrates computational system for performing visible object determination.

FIG. 7A presents one embodiment of a graphical computing system 80 for performing visible object determination. Graphical computing system 80 may include a system unit 82, and a display device 84 coupled to the system unit 82. The display device 84 may be realized by any of various types of video monitors or graphical displays. Graphics computer system 80 may include a keyboard 86 and preferably a mouse 88.

Figure 7B:
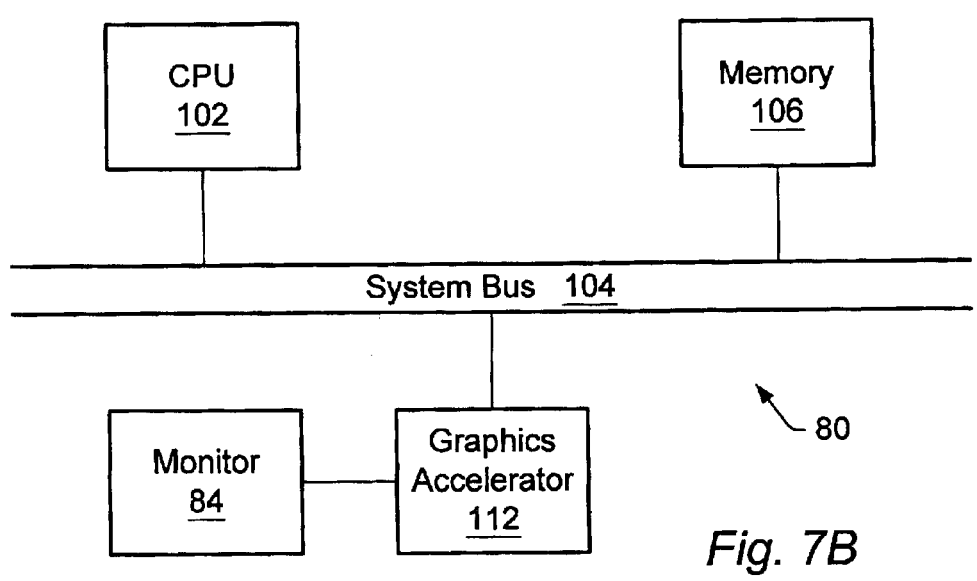
FIG. 7B is a block diagram of one embodiment of the system of FIG. 7A.

FIG. 7B is a block diagram illustrating one embodiment of graphical computing system 80. Graphical computing system 80 may include a host central processing unit (CPU) 102 coupled to a high speed bus or system bus 104. A system memory 106 may also be coupled to system bus 104. The system memory 106 may include any of various types of memory subsystems including random access memory, read only memory, and/or mass storage devices. The host processor 102 may execute a visualization software program which implements the visibility search procedure. The visualization software program determines the set of visible objects in a scene. The visualization software program may be stored in system memory 106. The host processor 102 may also execute one or more programs which implement the post-processing procedure and/or the rendering agent described above.

In an alternative embodiment, the visibility search procedure, the post-processing procedure and/or the rendering agent may be implemented on one or more programmable processors and/or in dedicated hardware devices comprised within a graphics accelerator (e.g. graphics accelerator 112).

In some embodiments, a 3-D graphics accelerator 112 may be coupled to system bus 104. If 3D accelerator 112 is not included in graphical computing system 80, then display device 84 may couple directly to system bus 104. It is assumed that various other peripheral devices, or other buses, may be connected to system bus 104, as is well known in the art. Display device 84 may couple to 3-D graphics accelerator 112. CPU 102 may transfer information to and from the graphics accelerator 112 according to a programmed input/output (I/O) protocol over the system bus 104. In one embodiment, the graphics accelerator 112 may access system memory 106 according to a direct memory access (DMA) protocol or through intelligent bus mastering.

3-D graphics accelerator 112 may be a specialized graphics rendering subsystem which is designed to off-load the 3-D rendering functions from the host processor, thus providing improved system performance. In a system with a 3-D graphics accelerator, one or more graphics application programs executing on the host processor 102 may generate a scene comprising a collection of objects at various positions and with various orientations in a three-dimensional space. A hull tree constructor may operate on the collection of objects to generate a hull tree. Pointers to the hull tree and the cone tree may be provided to the visiblity search procedure. The visibility search procedure operates on the cone tree and the hull tree as described above to identify visible objects (or visible leaf hulls which contain the visible objects) with respect to a viewing direction and view point in the three-dimensional space. Pointers to the visible objects may be provided to the 3-D graphics accelerator 112. The 3-D graphics accelerator 112 may then access the primitives (e.g. triangles) that define the visible objects. The 3-D graphics accelerator 112 may operate on the primitives making up the visible objects to generate video output for display device 84. Thus, the graphics accelerator 112 may implement the function of the rendering agent described above.

Figure 8:
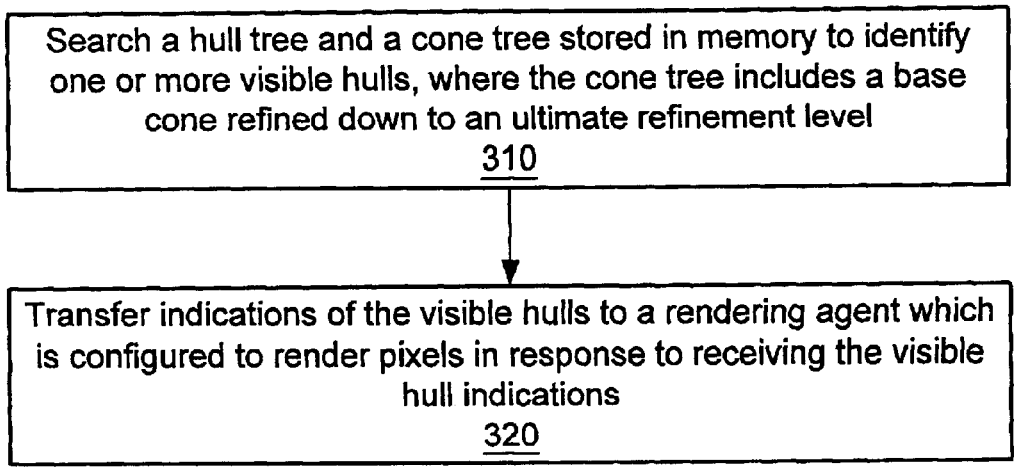
FIG. 8 illustrates one embodiment of a method for determining visible objects from a collection of objects from a current viewpoint.

FIG. 8 illustrates one embodiment of a method for identifying visible objects from a collection of objects. The embodiment of FIG. 8 includes the following steps. In step 310, a visibility search procedure (executing on one or more programmable processors and/or on one or more dedicated hardware circuits) searches a hull tree and a cone tree stored in memory to identify one or more visible hulls. The cone tree and hull tree respect the same group of transformation on the ambient space (e.g. the group of signed 3×3 permutation matrices).

In one embodiment, the visibility search procedure may compute sizes for a given cone and given hull. If the cone size is larger than the hull size, the visibility search procedure may conditionally search subcones of the cone with respect to the hull. Conversely, if the hull size is larger than the cone size, the visibility search procedure may conditionally search subhulls of the hull with respect to the cone. Thus, the relative sizes of the cone and hull determine which one first gets the finer investigation.

The cone tree stored in memory may include a base cone which is refined down to an ultimate refinement level. The stored cone tree may also include peer cones at the same refinement level as the base cone. However, in one set of embodiments, the peer cones are not refined, i.e. the cone tree does not store subcones for the peer cones.

In step 320, the visibility search procedure may transfer indications of the visible hulls to a rendering agent which is configured to render pixels in response to receiving the visible hull indications. The function of the rendering agent may be implemented in a graphics accelerator subsystem 112 and/or on host processor 102. The visibility search procedure may include a post-processing procedure which operates on the visible hull indications to generate a non-redundant list before forwarding the list to the rendering agent.

Figure 9:
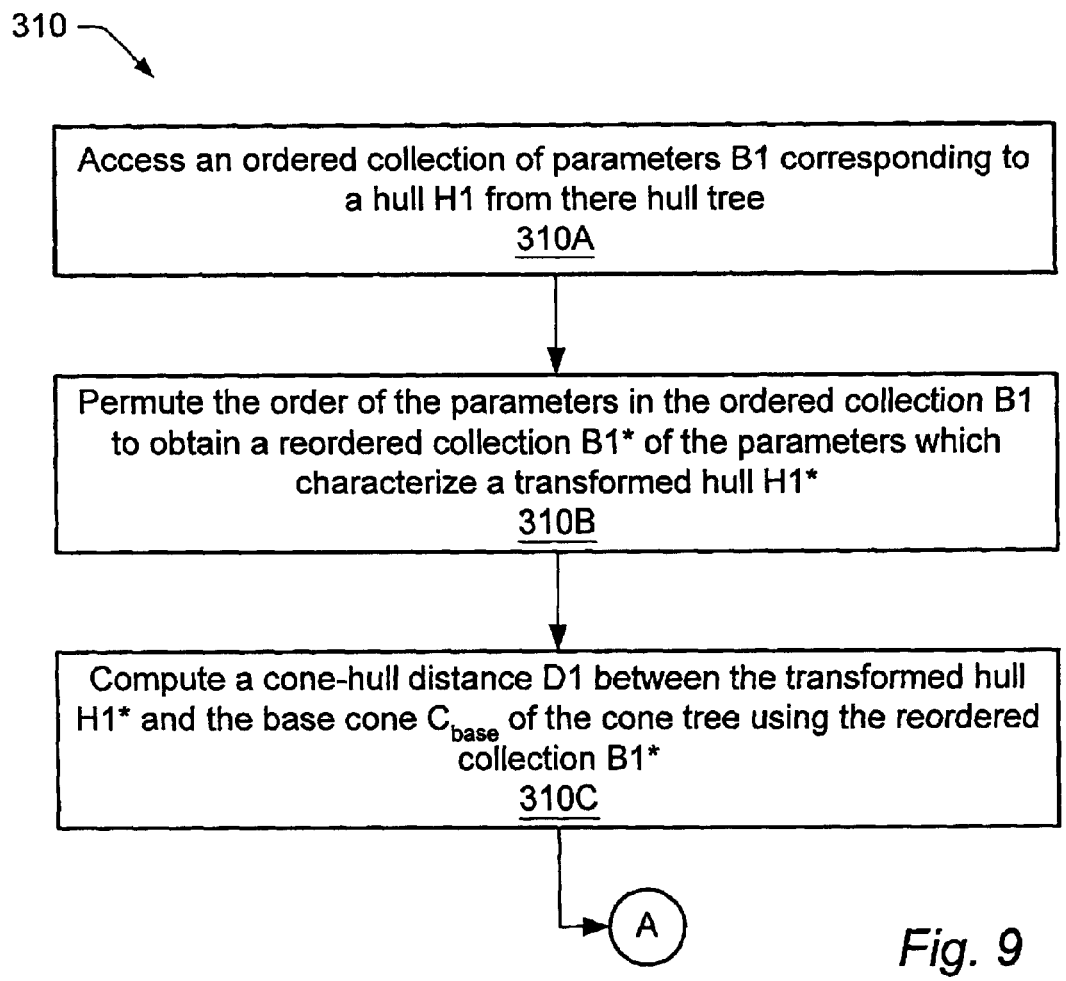
FIGS. 9 and 10 illustrate one embodiment of step 310 of FIG. 8.
Figure 10:
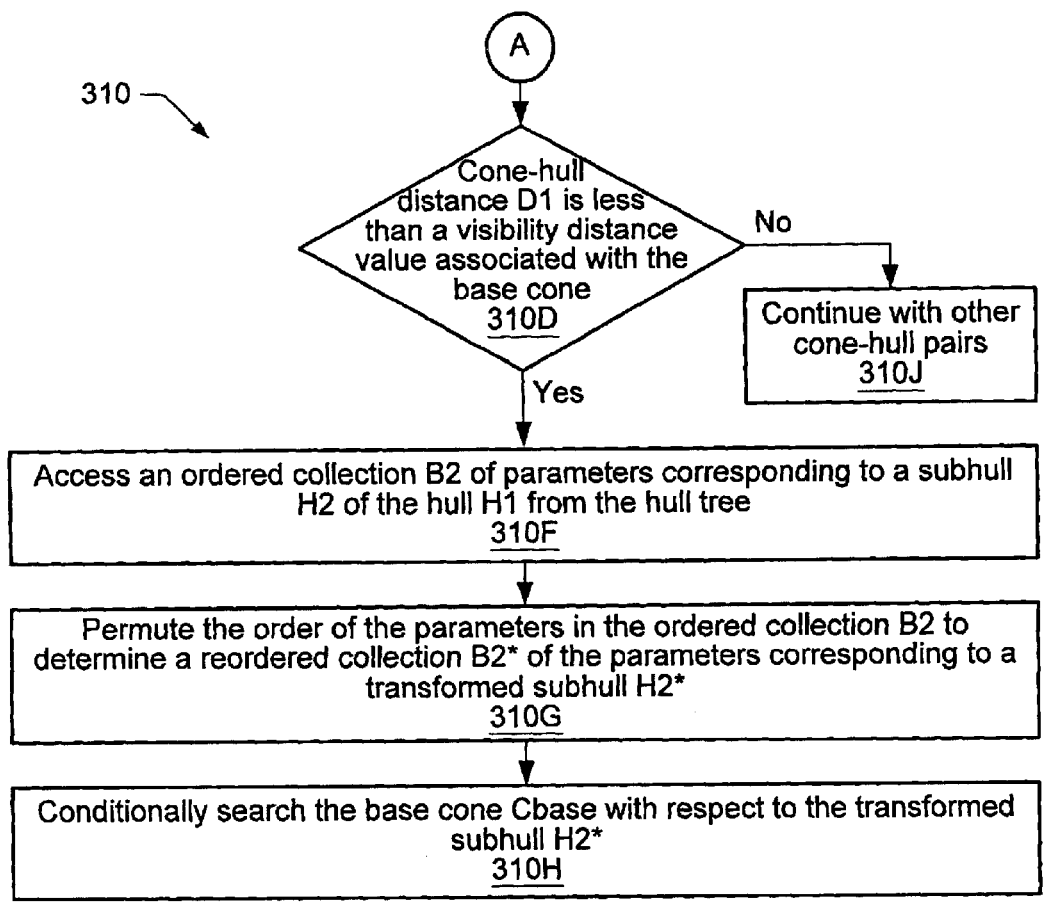

As part of search step 310, the visibility search procedure may identify a peer cone $C_{peer}$ which is to be investigated with respect to hull H1. Because subcones of the peer cone $C_{peer}$ are not stored in memory as part of the cone tree, the visibility search procedure realizes this search indirectly, i.e. by means of an equivalent search as described above. Thus, the search step 310 may include the following substeps as illustrated in FIGS. 9 and 10.

In substep 310A, the visibility search procedure may access an ordered collection B1 of parameters corresponding to the hull H1 from the hull tree. (The ordered collection may be a displacement vector as described variously.)

In substep 310B, the visibility search procedure may permute the order of the parameters in the ordered collection B1 to obtain a reordered collection B1* which characterizes a transformed hull H1*. The permutation corresponds to the spatial transformation which maps the peer cone $C_{peer}$ onto the base cone $C_{base}$ of the cone tree. (The permutation for each of the peer cones may be stored in memory buffer for faster access.)

In substep 310C, the visibility search procedure may compute a cone-hull distance D1 between the transformed hull H1\* and the base cone $C_{base}$ of the cone tree using the reordered collection of parameters B1\*.

In step 310D, the visibility search procedure may perform a test to determine if the cone-hull distance D1 is less than (or "less than or equal to") with respect to a visibility distance value associated with the base cone as shown in FIG. 9. Various other embodiments are contemplated where the cone-hull distance computation is replaced with the computation of an extent of proximity or some other extent of separation. Furthermore, the "less than" inequality of step 310D may be replaced by various other inequality conditions. An extent of proximity is a function that increases with increasing proximity (i.e. closeness) between the given cone and the given hull. An extent of separation is a function that increases with increases separation between the given cone and given hull.

In response to determining that the cone-hull distance D1 does not satisfy the inequality condition with respect to the visibility distance value associated with the base cone, the visibility search procedure may perform step 310J. In step 310J, the visibility search procedure may release the pair ($C_{peer}$,H1) and continue with other cone-hull pairs. Alternatively, in response to determining that the cone-hull distance D1 does satisfy the inequality condition with respect to the visibility distance value associated with the base cone, the visibility search procedure may perform step 310E.

In step 310E, the visibility search procedure may update the visibility distance value of the base cone with the cone-hull distance D1.

In step 310F, the visibility search procedure may access an ordered collection of parameters B2 corresponding to a subhull H2 of the hull H1 from the hull tree.

In step 310G, the visibility search procedure may permute the order of the parameters in the ordered collection B2 to determine a reordered collection B2\* corresponding to a transformed subhull H2\*. The permutation here is the same as the permutation applied to hull H1 above.)

In step 310H, the visibility search procedure may conditionally search the transformed subhull H2\* with respect to the base cone $C_{base}$. The conditional search comprises computing a cone-hull distance D2 between the transformed subhull H2\* and the base cone $C_{base}$ using the reordered collection B2\*, and searching the transformed subhull H2\* with respect to the base cone $C_{base}$ if the cone-hull distance D2 satisifes an inequality condition with respect to the visibility distance value of the base cone.

The visibility search procedure may repeat steps 310F through 310H for each of the subhulls of the hull H1.

Figure 11:
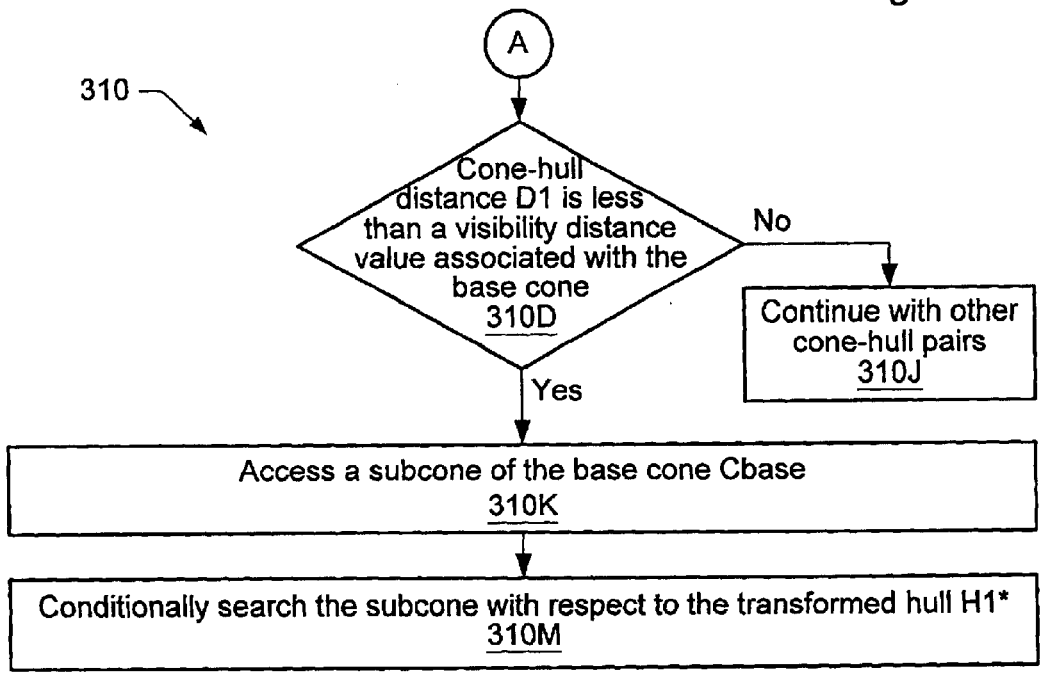
FIG. 11 illustrates an embodiment alternative to that shown in FIG. 10.

As an alternative to the embodiment of FIG. 10, the visibility search procedure may conditionally search subcones of the base cone with respect to the transformed hull H1\* as shown in FIG. 11. As before, the visibility search procedure may perform step 310D, and step 310J in response a determination that the cone-hull distance D1 is not less than the visibility distance value of the base cone.

In response to a determination that the cone-hull distance D1 is less than the visibility distance value of the base cone, the visibility search procedure may perform step 310K. In step 310K, the visibility search procedure may access a subcone of the base cone from the cone tree.

In step 310M, the visibility search procedure may conditionally search the subcone with respect to the transformed hull H1\*. This conditional search comprises computing a cone-hull distance D3 between the transformed hull H1\* and the subcone using the reordered collection of parameters B1\*, and searching the subcone with respect to the transformed hull H1\* in response to the cone-hull distance D3 being less than a visibility distance value of the subcone.

It is noted that the visibility search procedure may perform steps 310K and 310M for each of the subcones of the base cone, and then, update the visibility distance value of the base cone with the maximum of the visibility distance values of the subcones.

As described above, the visibility search procedure operates on cone-hull pairs. In one set of embodiment, before exploring a given cone-hull pair, the distance between the cone and the hull is measured. This involves determining the minimum distance to points residing in both the hull and the cone from the vertex of the cone. This cone-hull distance is then compared to the visibility distance value of the cone.

The visibility search procedure may search the cone tree and hull tree starting with the root cone and the root hull. Each leaf-cone may be assigned a visibility distance value which represents the distance to the closest known object as perceived from within the leaf-cone. Each leaf-cone may also be assigned an object attribute which specifies the closest known object within view of the leaf-cone. Similarly, each non-leaf cone may be assigned a visibility distance value. However, the visibility distance value of a non-leaf cone may be set equal to the maximum of the visibility distance values for its subcone children. This implies that the visibility distance value for each non-leaf cone equals the maximum of the visibility distance values of its leaf-cone descendents.

If the cone-hull distance is larger than the visibility distance value of the cone, all of the leaf-cone descendents of the given cone have known visible objects closer than the given hull by definition of the visibility distance value. Thus, there may be little benefit in exploring the cone-hull pair. In contrast, if the cone-hull distance is smaller than the visibility distance value of the cone, the hull may contain objects which will affect the visibility distance values of one or more leaf-cone descendents of the given cone. The cone-hull pair may be searched. Thus, cone-hull pairs are advantageously searched when there is a possibility that the given hull may affect the visibility of the cone's descendents. Thus, the visibility search procedure may avoid unnecessary cone-hull explorations and thereby saves considerable computational bandwidth.

Supposing that the search condition is satisfied, the hull is explored with respect to the given cone. If the cone and hull are both leaves of their respective trees, the hull specifies an object which is closer than the closest known object for the leaf-cone. Thus, the visibility distance value of the leaf-cone may be updated with the cone-hull distance between the cone and hull. Also, the object attribute for the cone may be updated to point to the given hull.

In the case that the cone is a leaf-cone and the hull is a non-leaf hull, the visibility search procedure may examine subhulls of the given hull, and conditionally explore these subhulls in ascending order of their cone-hull distance from the given cone. Again, exploration of a subhull is conditioned upon the subhull achieving a cone-hull distance to the given cone which is smaller than the cone's visibility distance value.

In the case that the cone is a non-leaf cone and the hull is a leaf hull (i.e. one which bounds a single object), the visibility search procedure may conditionally explore subcones of the given cone with respect to the given hull. Exploration of a subcone is conditioned upon the subcone achieving a cone-hull distance to the given hull which is smaller than the subcone's visibility distance value.

In the case that the cone is a non-leaf cone and the hull is a non-leaf hull, the visibility search procedure may conditionally explore subhulls of the given hull against the subcones of the given cone. Consider a particular subcone of the given cone for the sake of discussion. The subhulls of the given hull are conditionally explored against the subcone in ascending order of their cone-hull distances from the subcone. Because the closest subhull is searched first, and potentially decreases the visibility distance value of the given subcone, succeeding (more distant) subhulls will have more difficulty passing the search condition, i.e. of having a cone-hull distance to the given subcone which is less than the visibility distance value of the subcone. Thus, the probability is maximized that the fewest number of subhulls will need to be explored by ordering the conditional explorations according to cone-hull distance.

When the search of the two trees is completed, the object attribute of each leaf-cone points to the object which is visible to the leaf-cone, and the visibility distance value of the leaf-cone specifies the distance to the visible object. This visibility information is provided to the graphics accelerator so that the graphics accelerator may render the visible objects (or visible portions of visible object) on the display device.

In one embodiment, the visibility search procedure is implement by visualization software. The visualization software provides for interactive visualization by reading user inputs to control the current viewpoint and view-direction in the graphics environment. Additional software ensures efficient computation through the use of careful state management and parallelism.

In one alternative embodiment, the cone tree and hull tree are searched iteratively. In a second alternative embodiment, a level order search is performed on the cone tree and the hull tree.

A wide variety of techniques for measuring the extent of separation or proximity between a hull and a cone are contemplated. One set of embodiments focusses on minimizing an increasing function of separation distance between the vertex of the cone and points in the intersection of the cone and the hull. The cone-hull distance described above is one such increasing function of separation distance. Another set of embodiments involve maximizing a decreasing function of separation distance between the vertex of the cone and points in the intersection of the cone and the hull. In general, any wavefront with a boundary that obeys a mild "star shape" condition may provide the basis for a measurement of separation between a hull and a cone. Thus, various alternative embodiments are contemplated along these lines.

In another set of embodiments, each leaf-cone of the cone tree may store N object distances and N object pointers corresponding to the N closest known objects as perceived within the leaf cone from the common vertex (i.e. viewpoint) of the cone tree. Each leaf cone may additionally store a visibility distance value which represents the distance to the $N^{th}$ closest object, i.e. the last of the N closest objects. Similarly, each non-leaf cone may be assigned a visibility distance value. However, the visibility distance value of a non-leaf cone may be set equal to the maximum of the visibility distance values for its subcone children. This implies that the visibility distance value for each non-leaf cone equals the maximum of the visibility distance values of its leaf-cone descendents.

As described above, the visibility search procedure implements a dual-tree search of the cone tree and the hull tree which includes performing equivalent indirect searches when peer cones are encountered. The dual tree search may be illustrated in terms of a first cone of the cone tree structure and a first hull of the hull tree structure. The visibility search procedure may be implemented in software on a processor (or a plurality of processors). The processor may compute a cone size for the first cone and a hull size for the first hull, and may compare the cone size and the hull size. If the hull size is larger than the cone size, the processor may conditionally search subhulls of the first hull with respect to the first cone. A subhull of the first hull may be searched against the first cone if the subhull achieves a cone-hull distance with respect to the first cone which is smaller than the visibility distance value associated with the first cone.

If the cone size is larger than the hull size, the processor may conditionally search subcones of the first cone with respect to the first hull. A subcone of the first cone may be searched against the first hull if the subcone achieves a cone-hull distance with respect to the first hull which is smaller than the visibility distance value of the subcone.

A variety of methods are contemplated for computing the cone size and the hull size. By selecting the larger entity (first hull or first cone) for refinement, the visibility search method may, in some embodiments, prune the combined cone-hull tree more effectively, and determine the set of visible objects with increased efficiency.

Eventually the dual-tree search reaches a leaf cone of the cone tree and a leaf hull of the hull tree. In response to attaining a leaf cone and a leaf hull, the processor may:
  (a) compute a cone-hull distance for the leaf hull with respect to the leaf cone;
  (b) determine if the cone-hull distance is smaller than the visibility distance value associated with the leaf cone;
  (c) update the sequence of nearest object distances corresponding to the leaf cone based on the cone-hull distance; and
  (d) update the sequence of nearest object pointers corresponding to the leaf cone with an object pointer associated with the leaf hull.

Operations (c) and (d) may be performed in response to determining that the cone-hull distance is smaller than the visibility distance value associated with the leaf cone. The sequence of nearest object positions is ordered by magnitude. The processor determines where the cone-hull distance belongs in the sequence of nearest object distances and injects the cone-hull distance in the sequence of nearest object distances at the appropriate sequence position. The processor also injects the object pointer associated with the leaf hull at the same relative position in the sequence of nearest object pointers. Upon completing the dual-tree search, the processor may transmit the nearest object pointers (or a stream of triangles corresponding to the nearest object pointers) for the leaf cone to a rendering agent for rendering and display. The rendering agent may comprise a hardware rendering unit. In an alternative embodiment, the rendering agent may comprise a software renderer also executed by the processor or a different processor.

After the update operations (c) and (d), the processor may set the visibility distance value for the leaf cone equal to a $N^{th}$ object distance, i.e. the last of the N nearest object distances.

In some embodiments, each leaf hull of the hull tree may be classified as an occluder or a non-occluder. For example, a leaf hull with volume VLB which contains an object with volume VO may be classified as an occluder or non-occluder based on the magnitude of volume ratio VO/VLB. A variety of methods are contemplated for the occluder/non-occluder classification. In addition to determination (b), the processor may determine if the leaf hull is an occluder. Update operations (c) and (d) may be performed only for occluders, i.e. occluding leaf hulls. In contrast, leaf hulls that are determined to be non-occluders may be stored in a non-occluder buffer associated with the leaf cone, i.e. the cone-hull distance and object pointer associated with the leaf hull may be stored in the non-occluder buffer. Thus, the dual-tree search may identify, for each leaf cone, the N closest occluders and all non-occluders closer than the $N^{th}$ occluder, subject to storage limits in the non-occluder buffer(s). Upon completing the dual-tree search, the processor may transmit the nearest object pointers (i.e. the occluder pointers) and the non-occluder pointers (from the non-occluder buffer) to the rendering agent.

In other embodiments, each leaf hull may be assigned an occlusion metric value. The occlusion metric value may measure an extent of occlusion of the leaf hull. For example, the occlusion metric value for a leaf hull may be proportional to the cube root of the volume of the leaf hull. In one embodiment, the occlusion metric value may be proportional to the square root of a maximal bounding area for the leaf hull. In another embodiment, the occlusion metric value may be proportional to a diameter (e.g. a maximal diameter) or an average of multiple diameters of the leaf hull. A variety of methods are contemplated for assigning an occlusion metric value to a leaf hull. Each leaf cone may store three lists which describe a collection of nearest leaf hulls (or nearest objects) as perceived within the leaf cone. A leaf cone stores a list of nearest object pointers, a list of corresponding object distances, and a list of corresponding occlusion values. The lists may expand and contract as leaf hulls are discovered during the dual-tree search.

In response to attaining a leaf hull and a leaf cone in the dual-tree search, the processor may:

(a) compute a cone-hull distance for the leaf hull with respect to the leaf cone;

(b) determine if the cone-hull distance is smaller than the visibility distance value associated with the leaf cone;

(c) update the list of object distances corresponding to the leaf cone based on the cone-hull distance;

(d) update the list of nearest object pointers corresponding to the leaf cone with an object pointer associated with the leaf hull; and (e) update the list of occlusion values with the occlusion metric value of the leaf hull.

Operations (c), (d) and (e) may be performed in response to determining that the cone-hull distance is smaller than the visibility distance value associated with the leaf cone. The processor may continue to add to the three lists for each discovered leaf hull until the sum of the occlusion values reaches an occlusion threshold. When the occlusion threshold is reached, the view of the leaf cone may be assumed to be totally occluded with the currently gathered objects. After the occlusion threshold has been reached, the processor may add a closer leaf hull and flush one or more of the farthest leaf hulls from the three lists so that the sum of the occlusion values remains less than or equal to the occlusion threshold.

In one set of embodiments, each leaf cone of the cone tree may point to (or store) a collection of probe cones. Probe cones may comprise a subset of the cones from one or more levels below the leaf cone level. The probe cones for a given leaf cone may sample (e.g. uniformly sample) the space subtended by the leaf cone. The processor may perform the dual-tree search to determine a first visible object (e.g. a closest object, or a farthest of N closest objects) for a given leaf cone, and subsequently, may perform a search of the hull tree with respect to probe cones of the leaf cone to determine one or more additional visible objects for the leaf cone. Because the probe cones are smaller than the corresponding leaf cone, they may be able to "see" objects beyond (e.g. around the edges of) the first visible object. After the dual-tree search and the subsequent search, the processor may transmit an indication of the first visible object and the one or more additional visible objects for the given leaf cone to the rendering agent for rendering and display.

In one embodiment, the search of a hull tree with respect to a probe cone may be accelerated by searching a candidate hull only if it achieves a cone-hull distance with respect to the probe cone which is greater than or equal to the known distance to the first visible object determined by the dual-tree search.

In yet another set of embodiments, the visibility search procedure may be implemented in a graphical computation system comprising a plurality of processors, a display device, a shared memory, and optionally a graphics accelerator. The multiple processors execute the visibility search procedure in a parallel fashion. The cone tree and hull tree may be stored in the shared memory. In addition, the shared memory may store a global problem queue. The global problem queue is initially loaded with a collection of hull-cone pairs. Each hull-cone pair points to a hull in the hull tree and a cone in the cone tree.

The multiple processors may couple to the shared memory, and may perform a search of the cone and hull trees to identify one or more nearest objects for a subset of cones (e.g. the leaf cones) in the cone tree. After the multiple processors complete the search of the cone and hull trees, a transmission agent (e.g. the multiple processors, some subset thereof, or another set of one or more processors) may transmit graphics primitives, e.g. triangles, corresponding to the nearest objects of each cone in the subset, to a rendering agent. The rendering agent (e.g. the graphics accelerator, or a software renderer executing on the multiple processors, some subset thereof, or another set of one or more processors) is operable to receive the graphics primitives, to perform rendering computations on the graphics primitives to generate a stream of pixels, and to transmit the pixel stream to the display device.

In some embodiments, each leaf-cone may be assigned a visibility distance value which represents the distance to the closest known object as perceived from within the leaf-cone. Each leaf-cone may also be assigned an object pointer which specifies the closest known object within view of the leaf-cone. Similarly, each non-leaf cone may be assigned a visibility distance value. However, the visibility distance value of a non-leaf cone may be set equal to the maximum of the visibility distance values for its subcone children. This implies that the visibility distance value for each non-leaf cone equals the maximum of the visibility distance values of its leaf-cone descendents.

In one embodiment, each of the plurality of processors is operable to: (a) read a hull-cone pair (H,C) from the global work queue, (b) compute the distance between the hull H and the cone C, (c) to compare the hull-cone distance to a visibility distance associated with the cone C, (d) to write two or more dependent hull-cone pairs to the global problem queue if the hull-cone distance is smaller than the visibility distance of the cone C. The two or more dependent hull-cone pairs may be pairs generated from hull H and the subcones of cone C, or pairs generated from cone C and subhulls of hull H.

Furthermore, when the processor detects that the hull H is a leaf hull of the hull tree and the cone C is a leaf cone of the cone tree, the processor may update the visibility information for the leaf cone, i.e. may set the visibility distance value for cone C equal to the cone-hull distance computed in (b) above, and may set the nearest object pointer associated with cone C equal to a pointer associated with hull H.

In one alternative embodiment, each processor may couple to a local memory containing a local problem queue. Each processor may read and write hull-cone pairs from/to its local problem queue, and access the global problem queue to read initial hull-cone pairs.

In another alternative embodiment, a collection of cones may be selected from the cone tree, i.e. a collection of non-overlapping cones which fill the space of the root cone (i.e. top level cone). The cones of the collection may be distributed among the multiple processors. Each of the multiple processors may perform a search of its assigned cones (i.e. the subtrees of the cone tree defined by these assigned cones) against the hull tree.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A method for identifying visible objects from a collection of objects, the method comprising:
   searching a hull tree and a cone tree stored in memory to identify one or more visible hulls, wherein the cone tree includes a base cone refined down to an ultimate refinement level; and
   transferring indications of the visible hulls to a rendering agent which is configured to render pixels in response to receiving the visible hull indications; wherein said searching includes:
   (a) accessing a first ordered collection of parameters corresponding to a first hull from the hull tree;
   (b) permuting the order of the parameters in the first ordered collection to obtain a first reordered collection of the parameters which characterizes a first transformed hull;
   (c) computing a first cone-hull distance between the first transformed hull and the base cone of the cone tree using the first reordered collection of parameters.

2. The method of claim 1, wherein the cone tree includes peer cones at the same refinement level as the base cone, wherein the peer cones do not have subcones stored in the cone tree.

3. The method of claim 1 further comprising:
   determining if the first cone-hull distance satisfies a first inequality condition with respect to a visibility distance value associated with the base cone; and
   updating the visibility distance value of the base cone with the first cone-hull distance.

4. The method of claim 1 further comprising:
   accessing a second ordered collection of parameters corresponding to a subhull of the first hull from the hull tree in response to a determination that the first cone-hull distance satisfies a first inequality condition with respect to a visibility distance value associated with the base cone;
   permuting the order of the parameters in the second ordered collection to determine a second reordered collection of the parameters corresponding to a transformed subhull;
   conditionally searching the base cone with respect to the transformed subhull using the second reordered collection of parameters.

5. The method of claim 4, wherein said computing a first cone-hull distance between the first transformed hull and the base cone of the cone comprises solving a linear programming problem.

6. The method of claim 1 further comprising:
   accessing a subcone of the base cone from the cone tree in response to a determination that the first cone-hull distance satisfies a first inequality condition with respect to a visibility distance value associated with the base cone;
   conditionally searching the subcone with respect to the first transformed hull.

7. The method of claim 1 further comprising:
   receiving a collection of objects in a N-dimensional space; and
   bounding the objects with first order hulls;
   recursively bounding clusters of $K^{th}$ order hulls with $(K+1)^{st}$ order hull, where K starts at one, until all the objects are bounded by a single containing hull.

8. The method of claim 1, where said searching the hull tree and the cone tree comprises identifying one or more visible hulls for each of one or more leaf cones of the cone tree.

9. The method of claim 1, wherein (a), (b) and (c) are performed in response to identifying a peer cone in the cone tree, wherein the permutation applied in (b) is a permutation corresponding to a transformation that carries the peer cone onto the second cone.

10. The method of claim 9, wherein the permutation applied in (b) is stored with the peer cone in the cone tree.

11. The method of claim 1, wherein the cone tree and the hull tree respect the same group of transformations.

12. The method of claim 1, wherein the group of transformation is the group of signed 3×3 permutation matrices.

13. The method of claim 1, wherein the hull tree is generated by a set of normal vectors comprising three mutually orthogonal vectors and the negatives of the three mutually orthogonal vectors.

14. The method of claim 1, wherein the hull tree is generated by a set of normal vectors comprising the vertices of a cube centered at the origin.

15. The method of claim 1, wherein the hull tree is generated by a set of 20 normal vectors corresponding to the vertices of a dodecahedron.

16. A system for identifying visible objects from a collection of objects, the system comprising:
   a memory unit configured to store program code and a cone tree; and
   a processor configured to execute the program code, wherein, in response to an execution of the program code, the processor is operable to search a hull tree and the cone tree stored in the memory to identify one or more visible hulls, wherein the cone tree includes a base cone refined down to an ultimate refinement level, and to transfer indications of the visible hulls to a rendering agent which is configured to render pixels in response to receiving the visible hull indications, wherein, in response to said execution of the program code, the processor is configured implement said searching by:
   (a) accessing a first ordered collection of parameters corresponding to a first hull from the hull tree;
   (b) permuting the order of the parameters in the first ordered collection to obtain a first reordered collection of the parameters which characterizes a first transformed hull; and (c) computing a first cone-hull distance between the first transformed hull and the base cone of the cone tree using the first reordered collection of parameters.

17. The system of claim 16, wherein the cone tree includes peer cones at the same refinement level as the base cone, wherein the peer cones do not have subcones stored in the cone tree.

18. The system of claim 16, wherein the processor is further operable to:

determine if the first cone-hull distance satisfies a first inequality condition with respect to a visibility distance value associated with the base cone; and update the visibility distance value with the first cone-hull distance in response to determining that the first cone-hull distance satisfies the inequality condition with respect to the visibility distance value.

19. The system of claim 16, wherein the processor is further operable to:

access a second ordered collection of parameters corresponding to a subhull of the first hull from the hull tree in response to a determination that the first cone-hull distance satisfies a first inequality condition with respect to a visibility distance value associated with the base cone;

permute the order of the parameters in the second ordered collection to determine a second reordered collection of the parameters corresponding to a transformed subhull; and conditionally search the transformed subhull with respect to the base cone using the second reordered collection of parameters.

20. The system of claim 16, wherein the processor is further operable to:

access a subcone of the base cone from the cone tree in response to a determination that the first cone-hull distance satisfies a first inequality condition with respect to a visibility distance value associated with the base cone; and conditionally search the first transformed hull with respect to the subcone using the first reordered collection of parameters.

21. The system of claim 16, wherein the processor is further operable to:

receive a collection of objects in a N-dimensional space; and bound the objects with first order hulls;

recursively bound clusters of $K^{th}$ order hulls with $(K+1)^{st}$ order hull, where K starts at one, until all the objects are bounded by a single containing hull.

22. The system of claim 16, where said searching the hull tree and the cone tree comprises identifying one or more visible hulls for each of one or more leaf cones of the cone tree.

23. The system of claim 16, wherein the processor is operable to perform (a), (b) and (c) in response to identifying a peer cone in the cone tree, wherein the permutation applied in (b) is a permutation corresponding to a transformation that carries the peer cone onto the second cone.

24. The system of claim 23, wherein the permutation applied in (b) is stored with the peer cone in the cone tree.

25. The system of claim 16, wherein the cone tree and the hull tree respect the same group of transformations.

26. The system of claim 16, wherein the group of transformation is the group of signed 3×3 permutation matrices.

27. The system of claim 16, wherein the hull tree is generated by a set of normal vectors comprising three mutually orthogonal vectors and the negatives of the three mutually orthogonal vectors.

28. The system of claim 16, wherein the hull tree is generated by a set of normal vectors comprising the vertices of a cube centered at the origin.

29. The system of claim 16, wherein the hull tree is generated by a set of 20 normal vectors corresponding to the vertices of a dodecahedron.

30. A memory medium for storing program instruction executable by a processor, wherein, the program instructions are executable by the processor to implement:

searching a hull tree and a cone tree stored in memory to identify one or more visible hulls, wherein the cone tree includes a base cone refined down to an ultimate refinement level; and transferring indications of the visible hulls to a rendering agent which is configured to render pixels in response to receiving the visible hull indications; wherein said searching includes:

(a) accessing a first ordered collection of parameters corresponding to a first hull from the hull tree;

(b) permuting the order of the parameters in the first ordered collection to obtain a first reordered collection of the parameters which characterizes a first transformed hull;

(c) computing a first cone-hull distance between the first transformed hull and the base cone of the cone tree using the first reordered collection of parameters.

31. A method for identifying visible objects from a collection of objects:

searching cones in a cone tree with respect to hulls in a hull tree to identify one or more visible hulls from the hull tree, wherein said searching includes performing an equivalent search for a first cone and a first hull, wherein the equivalent search for the first cone and the first hull comprises directly searching a base cone and an transformed version of the first hull, wherein the base cone has descendents stored in the cone tree, wherein the first cone does not have descendents stored in the cone tree.

32. The method of claim 31, wherein said equivalent search for the first cone and the first hull comprises accessing a first displacement vector corresponding to the first hull from the hull tree, and applying a permutation corresponding to the first cone to the first displacement vector to obtain a second displacement vector characterizing the transformed version of the first hull.

* * * * *